(12) United States Patent
MacLaren (10) Patent No.: US 11,720,287 B1
(45) Date of Patent: Aug. 8, 2023

(54) SYSTEM AND METHOD FOR MEMORY MANAGEMENT

(71) Applicant: Cadence Design Systems, Inc., San Jose, CA (US)

(72) Inventor: John Michael MacLaren, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 2 days.

(21) Appl. No.: 17/536,440

(22) Filed: Nov. 29, 2021

(51) Int. Cl.
*G06F 3/06* (2006.01)

(52) U.S. Cl.
CPC ............ *G06F 3/0659* (2013.01); *G06F 3/067* (2013.01); *G06F 3/0619* (2013.01); *G06F 3/0631* (2013.01); *G06F 3/0656* (2013.01)

(58) Field of Classification Search
None
See application file for complete search history.

(56) References Cited

U.S. PATENT DOCUMENTS

| | | | |
|---|---|---|---|
| 2003/0030643 A1* | 2/2003 | Taylor | G06F 5/06 345/531 |
| 2018/0059945 A1* | 3/2018 | Helmick | G06F 3/061 |

FOREIGN PATENT DOCUMENTS

CN 112540721 A * 3/2021 ............. G06F 1/266

* cited by examiner

*Primary Examiner* — Brian R Peugh
(74) *Attorney, Agent, or Firm* — Mark H. Whittenberger; Holland & Knight LLP (57) ABSTRACT

Embodiments include herein are directed towards a double data rate ("DDR") controller system. Embodiments may include a plurality of read data buffers, wherein each of the plurality of read data buffers is configured for read data storage and is of a same size. Embodiments may further include a port read response queue that stores information corresponding to an incoming read and a command queue configured to receive read data buffer state information from the port read response queue. Embodiments may also include a read data buffer allocation tracker configured to track a state of each of the plurality of read data buffers.

20 Claims, 5 Drawing Sheets

SYSTEM AND METHOD FOR MEMORY MANAGEMENT

FIELD OF THE INVENTION

The present disclosure relates to a system and method of memory management, and more particularly, to a dynamic random access memory ("DRAM") controller configuration.

BACKGROUND

A memory controller (e.g. double data rate ("DDR")) may interface with DRAM based memory storage. Data may be stored and retrieved by writes and reads and the controller may be interconnected to the system on a standard port interface (e.g., "Denali" and Coherent Hub Interface "CHI" available from the Assignee of the present disclosure). For some interconnects the read data for reads from the same source ID and the same port must be returned on the interconnect in the order that the read requests are received. This is due to the fact that the data is not sent with a data tag to distinguish the data order back at the source, so it is required that the data is returned in order. For reads with different source IDs, the data may be returned out of order. Moreover, for reads from different ports which are to different interconnect points in the system there may be no ordering rules at all. A non-interleaved operation, if enabled, further restricts the read data ordering such that once the first portion of data for a read command is returned, all data must be returned consecutively without any other read data between.

SUMMARY

In one or more embodiments of the present disclosure, a double data rate ("DDR") controller system is provided. The system may include a plurality of read data buffers, wherein each of the plurality of read data buffers is configured for read data storage and is of a same size. The system may further include a port read response queue that stores information corresponding to an incoming read and a command queue configured to receive read data buffer state information from the port read response queue. The system may also include a read data buffer allocation tracker configured to track a state of each of the plurality of read data buffers.

One or more of the following features may be included. In some embodiments, the read data buffer allocation tracker may be configured to determine if a read data buffer is impeded. The read data buffer allocation tracker may be configured to determine if a read data buffer is unimpeded. The read data buffer allocation tracker may be configured to determine a number of read data buffers allocated to out of order read data. A read data buffer may transition from impeded to unimpeded upon executing a command in the command queue. The read data buffer allocation tracker may determine whether a threshold number of impeded read data buffers has been reached. The read data buffer allocation tracker may transmit a signal to the command queue indicating only unimpeded reads may be executed. The read data buffer allocation tracker may receive feedback from the port read response queue. Each of the plurality of read data buffers may include a plurality of command queue entries. The command queue may allow out of order execution of read commands.

In one or more embodiments of the present disclosure a method is provided. The method may include storing read data using a plurality of read data buffers, wherein each of the plurality of read data buffers is of a same size. The method may further include storing information corresponding to an incoming read in a port read response queue and receiving read data buffer state information from the port read response queue at a command queue. The method may also include tracking a state of one or more of the plurality of read data buffers using a read data buffer allocation tracker.

One or more of the following features may be included. In some embodiments, the method may include determining if a read data buffer is impeded using the read data buffer allocation tracker. The method may further include determining if a read data buffer is unimpeded using the read data buffer allocation tracker. The method may also include determining a number of read data buffers allocated to out of order read data using the read data buffer allocation tracker. The method may also include transitioning a read data buffer from impeded to unimpeded upon executing a command in the command queue. The method may further include determining whether a threshold number of impeded read data buffers has been reached using the read data buffer allocation tracker. The method may also include transmitting a signal to the command queue indicating only unimpeded reads may be executed using the read data buffer allocation tracker. The method may further include receiving feedback from the port read response queue at the read data buffer allocation tracker. Each of the plurality of read data buffers may include a plurality of command queue entries. The command queue may allow out of order execution of read commands.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

One of the primary objectives of a DRAM controller is to maximize memory bus efficiency which is highly dependent on command ordering due to a wide variety of command to command timing limitations imposed by the DRAM architecture. This includes DRAM organization into pages resulting in hits and misses, bank groups, precharges, activates, activate to activate timing, etc. The controller and storage process described herein may reorganize the order of command execution to overcome these timing limitations and achieve much higher bus efficiency thus increasing overall system performance.

Execution of read commands to the DRAM in the order received on the interconnect limits the controller's ability to reorganize read commands for optimal efficiency and may significantly reduce performance. Performance may be increased by reordering the read operations for maximum efficiency while maintaining the order requirements in the port to send the read data on the interconnect in the order required. In other words, allowing out-of-order read execution on the memory bus and maintaining in-order data back to the interconnect provides optimal performance.

Reads from the same source ID must be returned in order on the port interface. Reads coming into the controller can be from the same source ID or different source IDs. Read command execution to the DRAM can be reordered relative to the order in which the reads were originally received from the requestor (the port). However, the read data coming back from the DRAM reads may then have to be stored in the read data buffers (RDBs) in the port waiting for read data from reads that arrived earlier, but executed later, to be returned before the data can be transferred on the interconnect. The ideal performance may be obtained by assigning the read data buffers at the point of read execution. This allows the maximum flexibility in read data reordering. Assigning the read data buffers earlier, for example when the reads are received at the port, may significantly limit read reordering. One of the factors in this is that the controller may be able to hold many more read commands than there are read data buffers available. For example, the controller may have 64 reads in the command queue and 16 read data buffers. If none of the 64 reads have been assigned an RDB, any of the 64 reads can be executed. But if the RDBs are assigned, some ordering constraints must be applied.

However, if too many of the read data buffers are assigned to out-of-order reads, eventually the system will slow down because the number of RDBs available will be reduced and will eventually throttle the execution of reads due to a lack of read data storage for additional reads. Furthermore, if all of the RDBs are filled with out-of-order read data, the system will be locked up with no place to store read data and no way to send read data out to the port.

Accordingly, embodiments of the storage process described herein may include tracking the number of read data buffers allocated to out of order reads (referred to herein as impeded reads). If a threshold is exceeded, the process may stop allowing out-of-order commands and only accept read data for reads that are in order (referred to herein as unimpeded reads).

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings may denote like elements.

Figure 1:
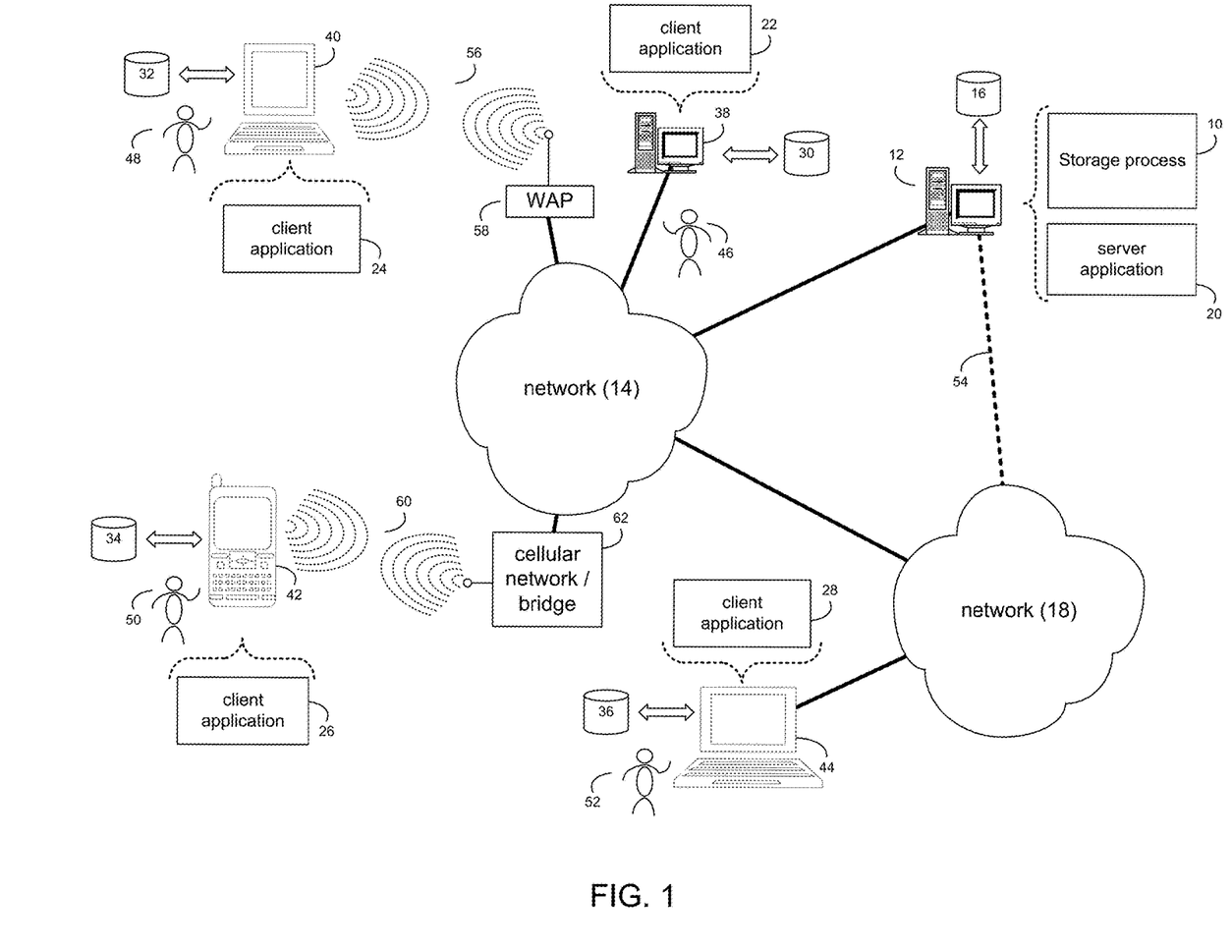
FIG. 1 diagrammatically depicts a storage process coupled to a distributed computing network.

Referring to FIG. 1, there is shown a storage process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, storage process 10 may reside on a client electronic device, such as a personal computer, notebook computer, personal digital assistant, or the like.

The instruction sets and subroutines of storage process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute storage process 10. Examples of client applications 22, 24, 26, 28 may include, but are not limited to, design verification tools such as those available from the assignee of the present disclosure. These applications may also be executed by server computer 12. In some embodiments, storage process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the storage process may be a client-side application (not shown) residing on one or more client electronic devices 38, 40, 42, 44 (e.g., stored on storage devices 30, 32, 34, 36, respectively). As such, the storage process may be a stand-alone application that interfaces with a client application (e.g., client applications 22, 24, 26, 28), or may be an applet/application that is executed within a client application. As such, the storage process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, storage process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple iOS, ANDROID, or a custom operating system.

Figure 2:
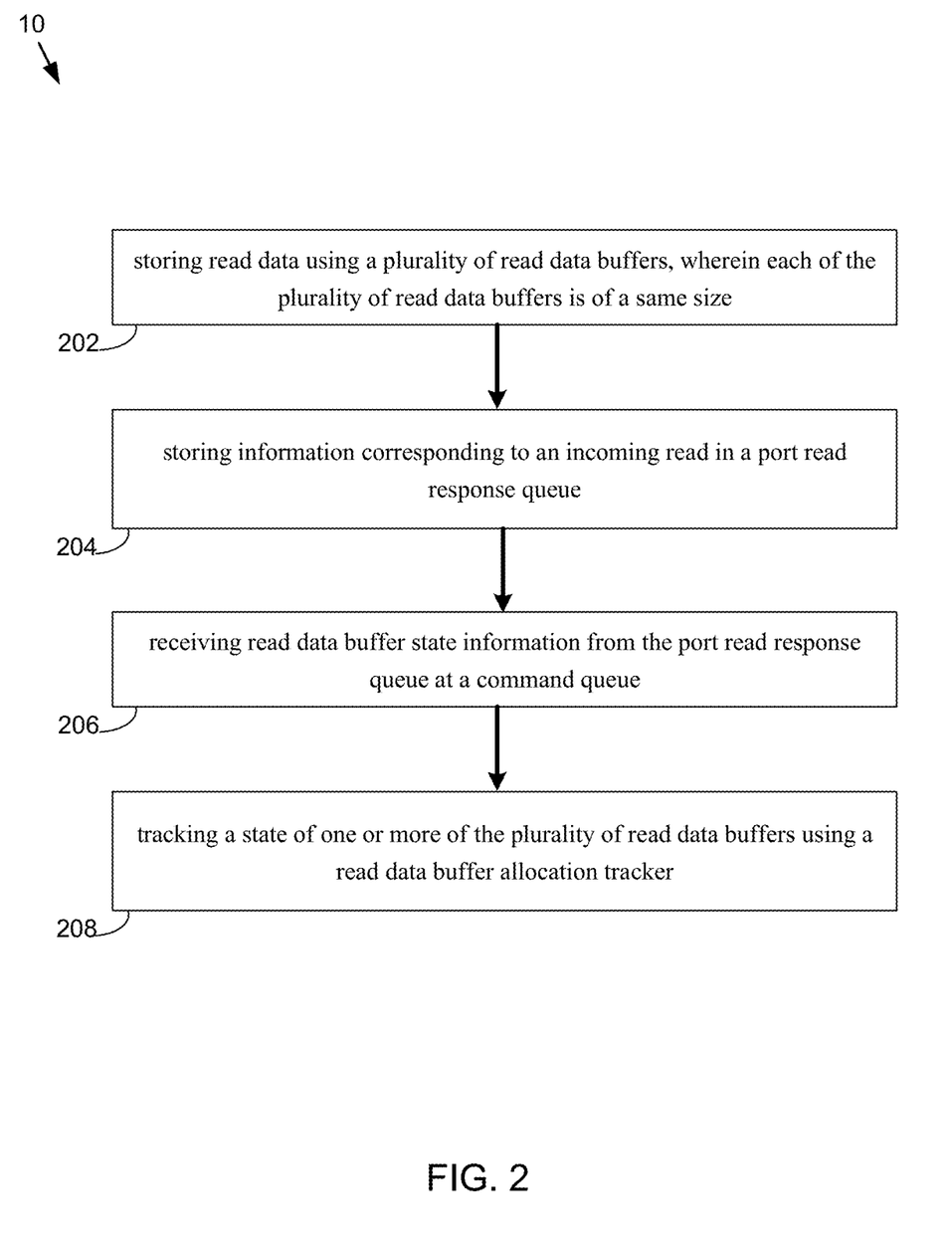
FIG. 2 is an exemplary flowchart of a storage process according to an embodiment of the present disclosure.

Referring now to FIG. 2, a flowchart depicting an embodiment consistent with storage process 10 is provided. The method may include storing 202 read data using a plurality of read data buffers, wherein each of the plurality of read data buffers is of a same size. The method may further include storing 204 information corresponding to an incoming read in a port read response queue. The method may also include receiving 206 read data buffer state information from the port read response queue at a command queue. The method may further include tracking 208 a state of one or more of the plurality of read data buffers using a read data buffer allocation tracker. Numerous other operations are also within the scope of the present disclosure.

Figure 3:
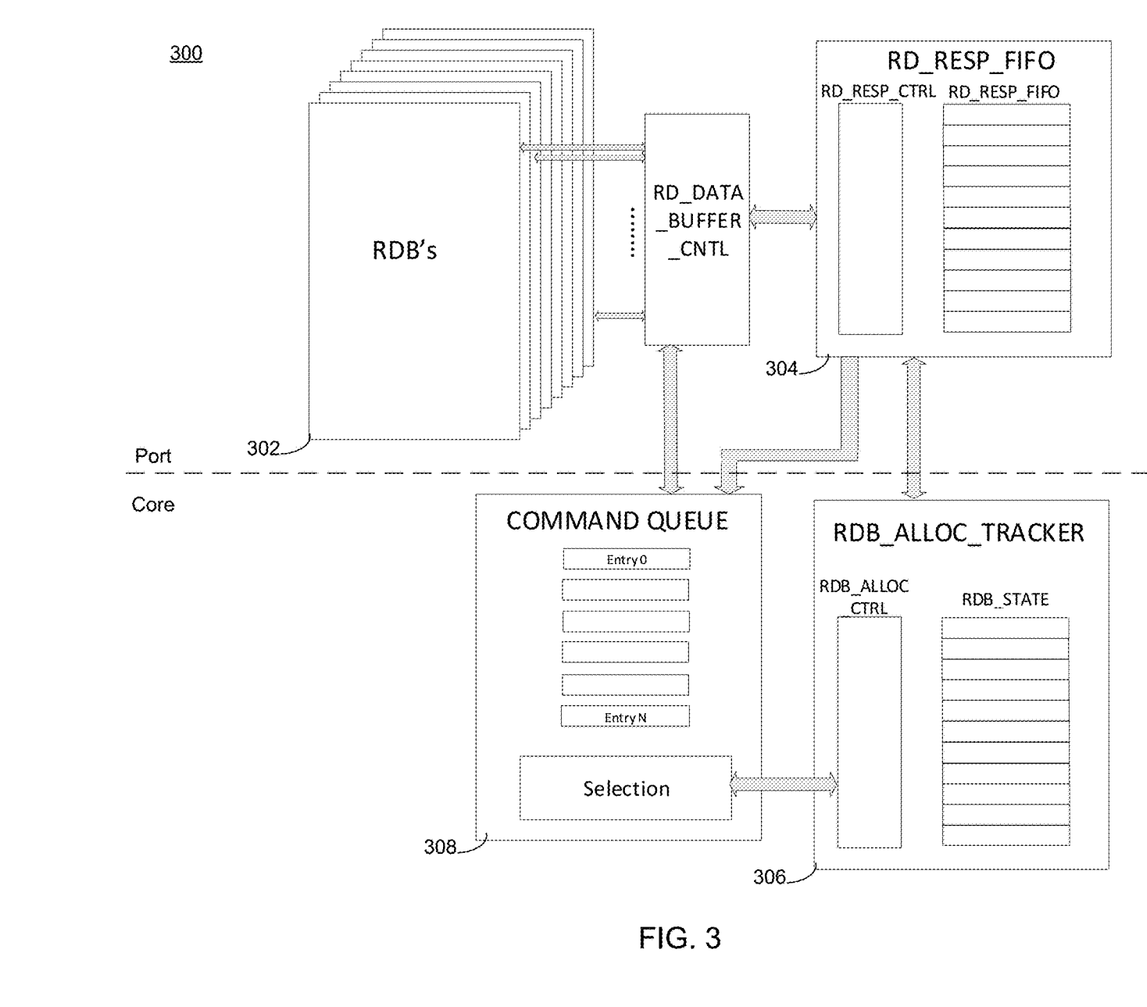
FIG. 3 is a block diagram showing an example associated with a storage process according to an embodiment of the present disclosure.
Figure 4:
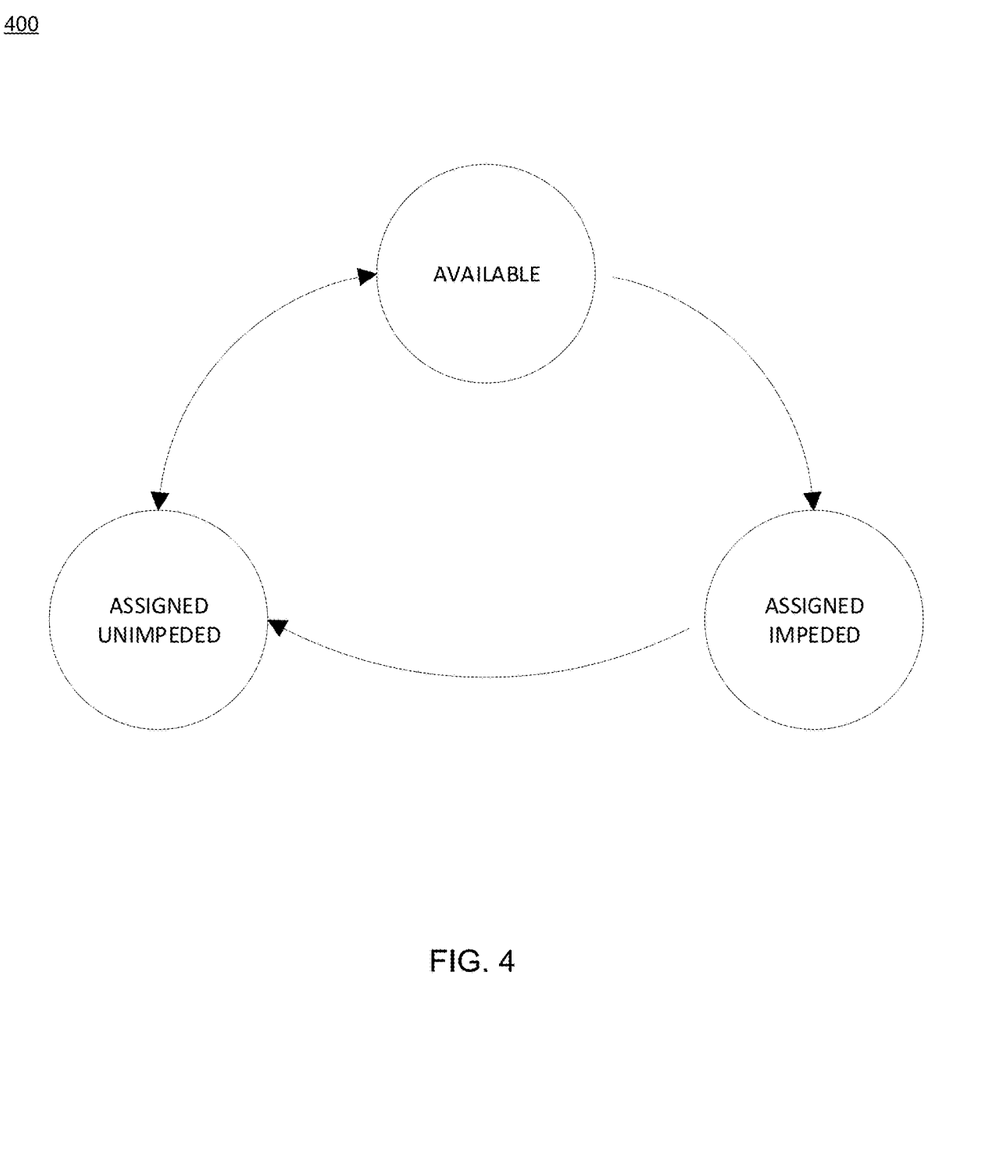
FIG. 4 is a state diagram showing an example of bank management associated with a storage process according to an embodiment of the present disclosure.
Figure 5:
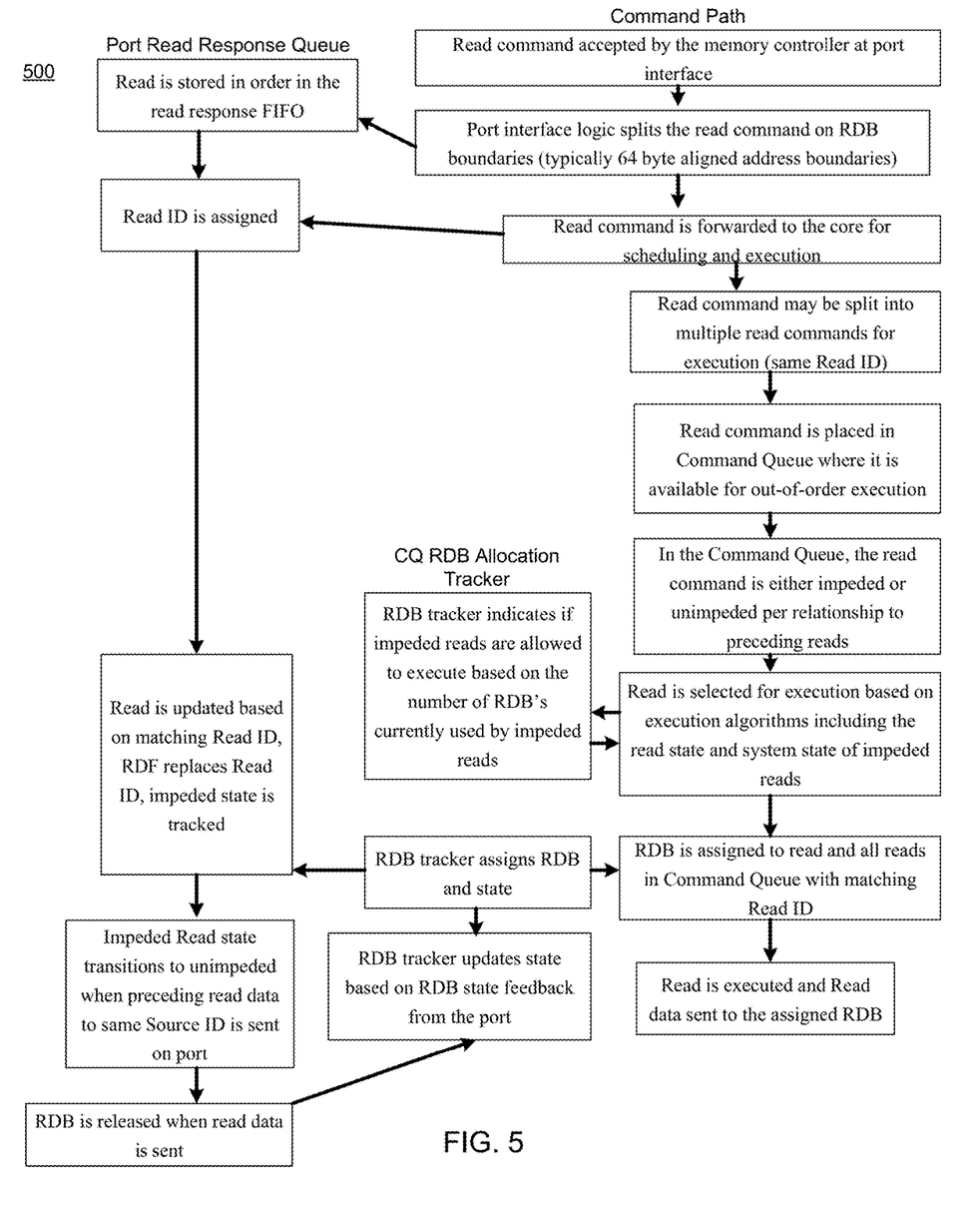
FIG. 5 is an exemplary flowchart of a storage process according to an embodiment of the present disclosure.

Referring now to FIGS. 3-5, numerous figures consistent with embodiments of storage process 10 are provided. FIG. 3 depicts an example block diagram 300 consistent with embodiments of the present disclosure. In some embodiments, a collection of same size read data buffers (RDBs) may be used for read data storage. RDBs may be allocated at the point of read execution to maximize the ability to issue reads out-of-order. RDB's may be used in place of a read data FIFO. A FIFO would require read data to be returned in order or, at least, limit out-of-order options. In contrast, RDB's may be completely independent allowing maximum reordering of read data. The RDB's may be sized to the typical read size, typically a cacheline of data. Uniform sizing is appropriate as these may include a pool of read data storage buffers. Reads smaller than an RDB may still use a single RDB while reads larger than an RDB may be split into smaller reads, each of which may consume an RDB. Since read data storage takes up a large amount of area, efficient use of storage is a critical component of a good solution. Properly sized RDB's provide the best trade-off between storage capacity and performance.

In some embodiments, and as discussed above, storage process 10 may allow for tracking the number of RDBs allocated to out-of-order read data (impeded reads). Impeded reads are reads that cannot send their read data ahead of another read's data and that read has not yet been allocated an RDB.

In some embodiments, storage process 10 may be configured for tracking one or more impeded reads vs. unimpeded reads at selection for execution. The process may also be configured to execute one or more reads based on the level of unimpeded reads relative to a programmable threshold.

As shown in FIG. 3, in some embodiments, exemplary RDB logic may include, but is not limited to, read data buffer storage 302, port read response queue 304, command queue RDB allocation tracker 306, and command queue command selection logic 308. In some embodiments, RDBs 302 may include a collection of the read data buffers. RDBs may be sized based on a typical interconnect transfer size, which may generally include a cacheline of data (e.g., 64 bytes). Incoming reads can be of a wide variety of sizes. If the read is larger than a an RDB, the read may be split in the port into RDB sized reads before going to the controller core. Commands within the core of the controller may manage RDB sized transactions or the transactions may be further subdivided within the core. For example, if the RDB is 64 bytes and a memory burst is 32 bytes, the core of the controller may split commands into memory bursts such that each RDB holds two core commands of read data. However, if the memory burst matches the RDB size, then the core commands may match the size of the RDB.

In some embodiments, port read response queue 304 may be configured to store all read requests in a FIFO as well as all RDB assignments. Reads may be stored using an in order FIFO, but may be positioned out of order as read data is returned on the port read data interface. All unimpeded read entries with read data available may be selected to return read data. Accordingly, when the read data is returned, the entry may be released and the other entries in the FIFO move up such that new reads always enter at the back of the FIFO. Reads may initially be sent to command queue 308, where read reordering may be performed with a read ID. When a read is selected for execution, the Read ID may be replaced with the RDB number. Port read response queue 304 may be configured to accurately assign all RDB buffer states as unassigned, assigned-impeded, and/or assigned-unimpeded each of which is discussed in further detail hereinbelow.

In some embodiments, storage process 10 may be configured to determine the state of all valid entries. Accordingly, if the read is nearest the top for its source ID, it is unimpeded. Additionally and/or alternatively, if the read is not nearest the top, has an RDB assigned, and all preceding RDBs are unimpeded, it is unimpeded. Otherwise, the read is impeded. RDB state information may be sent to command queue RDB allocation tracker 306 to keep the execution side of the controller in sync with the port side.

In some embodiments, command queue RDB allocation tracker 306 may be configured to track the state of all RDBs at the point of command execution. The states may be the same as in the port, but the tracker state may be different from the port at times. Tracker 306 may be configured to drive the signal to the execution unit that indicates if all reads (e.g., impeded, unimpeded) may be selected for execution, or only unimpeded. This determination may be made by comparing the number of RDBs currently in the impeded state with the programmable threshold for the maximum number of allowed RDBs in the impeded state. Because an RDB can be assigned on every clock, immediate feedback may be needed from the tracker.

In some embodiments, tracker 306 may use the following criteria to initially set the RDB state. First, if the selected read is the highest in the queue to the Source ID, it is unimpeded. If the selected read is already assigned an RDB, it is unimpeded. Otherwise, the read is impeded. Tracker 306 may not be capable of determining if a read is unimpeded with perfect accuracy like port read response queue 304. However, the port read response queue information may not be immediately available due to pipeline and computational stages in the flow of transactions, therefore it is necessary to have the local tracker. The local tracker is pessimistic, as it may never assign a state of unimpeded when the actual state impeded. When the port read response queue state is sent to tracker 306, the tracker may be configured to update the state, if necessary. In this manner, tracker 306 may maintain the reasonable accuracy required to manage the number of impeded RDBs. Because RDBs are per port, if a controller has multiple ports, each port's RDBs may be tracked independently and the ability to executed impeded reads is applied per port. Commands in the command queue 308 may include a port ID so this distinction can be enforced.

In some embodiments, command queue 308 may be associated with an execution unit that may be configured to execute one or more reads from command queue 308 in the order that allows the highest efficiency utilization of the memory bus. This is a critical function of a DRAM memory controller. Command queue 308 may include any number of entries, however it may typically include 16, 32, or even 64 entries to maximize the ability of the controller to reorder reads to improve performance.

In some embodiments, multiple read entries in command queue 308 may be to the same RDB. This may be the case where the RDB is larger than a memory burst and the command is sub-divided in the core into memory burst sized transactions. Accordingly, these transactions may share an RDB. In this situation, the reads may have the same read ID initially assigned. The reads may be executed out of order. When any of these reads are selected for execution, all of the other reads that remain in command queue 308 waiting to be executed may also be assigned the same RDB number. Once the RDB number is assigned, these reads become unimpeded for execution because the RDB is already allocated. The execution logic may use the rdb_track_portN_no_impeded_rd signal to determine if impeded reads are available for execution. This signal is the indicator from the RDB_ALLOC_TRACKER indicating if impeded reads are able to be executed or not based on the number of RDB's in the impeded state versus the threshold.

In some embodiments, and as discussed above, read information may be stored in port read response queue 304 to maintain information about the read such as the source ID and command order. Each entry in the queue may correspond to one RDB worth of read data. Initially, port read response queue 304 may assign the read command going to the core a read ID. This read ID may be a placeholder for the RDB number which may be assigned later either at selection or while in command queue 308. The read ID may be stored in read response queue 304 to index the read command back from the core to the corresponding entry in the queue.

In operation, when the read is assigned an RDB, the RDB may be sent back to read response queue 304 with the read ID. The entry in read response queue 304 may be updated with the RDB number. As reads are executed and RDBs are assigned, port read response queue 304 may track the RDB states in the port. As read data is returned that is in-order and can be sent on the interconnect, the read data may be sent and the RDBs may be released for new read commands. Read data that is out-of-order may be blocked (impeded) until the preceding in order read data is returned. Port read response queue 304 may pass this RDB state information to the command queue RDB allocation tracker 306 for RDB state tracking.

In some embodiments, command queue RDB allocation tracker 306 may include logic in the core of the controller that may be configured to track the state of the RDBs. As discussed above, an RDB may be either impeded or unimpeded. An RDB is impeded if the read data stored in that RDB cannot be returned until a command in command queue 308 is executed. An RDB may be unimpeded if its data may be returned without any additional commands being executed from command queue 308.

In some embodiments, and referring also to FIG. 4, a state diagram consistent with embodiments of the present disclosure is provided. RDB states may be tracked based on inputs from command queue 308 command (selection/execution) and port read response queue 304. From the RDB states and programming, tracker 306 may generate output signals for selection used to determine if impeded reads can be selected for execution. One or more rules may apply based on the current state. For example, if "available" an RDB may not be assigned to a read. This may transition to "assigned" upon selection where impeded or unimpeded may be based on the field in the command queue entry. The state of the RDB from the port may lag the local transition. An "assigned impeded" state may indicate that an RDB is assigned to a read that may be impeded. This may transition to "assigned unimpeded" when the port state indicates unimpeded. An "assigned unimpeded" state may indicate an RDB is assigned to a read that is not impeded. This may transition to "available" when the port state transitions from assigned to available. Since the port may remain in the available state after the local state is transitioned to the assigned state, the tracker state may wait for the port to go to the assigned state and then to the available state before transitioning locally back to the available state.

In some embodiments, RDB allocation tracker 306 may track the state of all RDBs. Tracker 306 may be located in any suitable location such as the command queue where command execution order is determined. Some states may include, but are not limited to, "unassigned" where the RDB is not currently assigned to a read, "assigned/impeded" where the RDB may be assigned to a read and the read is currently impeded by another read, and/or "assigned/unimpeded" where the RDB is assigned to a read and the read is not impeded.

In some embodiments, a programmable threshold may be set that limits the number of RDBs that may be in the assigned impeded state. For example, if there are 16 RDBs, the limit might be programmed to 12. As long as the number of RDBs in the assigned impeded state is less than 12, the execution logic may be able to execute any read in the command queue without order restrictions based on the source ID ordering. If, however, the number of RDBs reaches 12 or more, a signal may be set to the execution logic indicating that only unimpeded reads are permitted to be executed. When the number of RDBs in tracker 306 that are impeded reaches the programmable threshold, tracker 306 may send a signal to the command queue selection logic 308 indicating that only unimpeded reads can be executed. This prevents performance degradation and system lock-up due to insufficient RDBs being available for unimpeded (or in-order) read data transfer.

In some embodiments, RDB allocation tracker 306 may not perfectly track the read states (impeded or unimpeded) at execution, as such, the tracker must conservatively track these states. Port read response queue 304 more accurately tracks the read states, but the read response queue is located in the port. The read response queue state information may be sent to tracker 306 and the tracker may then update the RDB state based on feedback from the port read response queue which includes precise tracking ability. However, since read response queue 304 is in the port (several pipeline stages away from the core as indicated in FIG. 3), it has too much delay to use directly for managing the execution. It should be noted that a command can be executed on every clock, so RDB allocation tracker 306 has to be local for state tracking on every clock.

In some embodiments, an RDB may be larger than a single memory burst. For example, the RDB may be 64 bytes and a memory burst may be 32 bytes. In this case, a single RDB may be serviced by two independent reads in the command queue. In this case, the reads to occupy a single RDB may initially have the same read ID assigned to their entries in read response queue 304 and assigned to the reads in command queue 308. When any read with the same read ID is selected for execution, the RDB may be assigned and that RDB may be assigned to all of the reads in command queue 308 with the same read ID since that read now has an RDB assigned per the preceding read being executed. Here, the RDB assignment must go back to port read response queue 304 to replace the read ID for all the reads. The reads in command queue 308 with an RDB assigned are no longer impeded even if executed out of order because they already have an RDB assigned.

In some embodiments, one or more rules may be used to track reads as impeded and unimpeded and to update these states in port read response queue 304 and the command queue RDB allocation tracker 306. Additionally and/or alternatively, various rules may be enforced for execution order based on impeded and unimpeded states.

Referring again to FIG. 3, tracking of RDB usage for impeded read data may be performed in multiple locations. For example, in read response queue 304 in the port and in the RDB allocation tracker 306 in the command queue 308. In read response queue 304, the state of each RDB regarding impeded read data is accurately defined. However, there is a potentially large delay between the command queue 308 selection logic and read response queue 304 making it impractical to use the read response queue RDB state to directly control the selection logic. In the command queue RDB allocation tracker 306, the state of the RDBs may be tracked, but with limited accuracy. Communication between the two modules may be required for proper operation. RDB state information may be passed back from the read response queue to the RDB allocation tracker 306 to obtain accurate state information.

Referring again to FIG. 5, a flowchart 500 depicting numerous operations consistent with embodiments of storage process 10 is provided. It should be noted that the operations included are provided merely by way of example as other operations are also within the scope of the present disclosure.

It will be apparent to those skilled in the art that various modifications and variations can be made in the embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A double data rate ("DDR") controller system comprising:
    a plurality of read data buffers, wherein each of the plurality of read data buffers is configured for read data storage;
    a port read response queue that stores information corresponding to an incoming read;
    a command queue configured to receive read data buffer state information from the port read response queue by way of a read data buffer allocation tracker; and
    said read data buffer allocation tracker configured to track said read data buffer state information of each of the plurality of read data buffers.

2. The system of claim 1, wherein the read data buffer allocation tracker is configured to determine if a read data buffer is impeded.

3. The system of claim 2, wherein the read data buffer allocation tracker is configured to determine a number of read data buffers allocated to out of order read data.

4. The system of claim 2, wherein a read data buffer can transition from impeded to unimpeded upon executing a command in the command queue.

5. The system of claim 1, wherein the read data buffer allocation tracker is configured to determine if a read data buffer is unimpeded.

6. The system of claim 1, wherein the read data buffer allocation tracker determines whether a threshold number of impeded read data buffers has been reached.

7. The system claim 6, wherein the read data buffer allocation tracker transmits a signal to the command queue indicating only unimpeded reads may be executed.

8. The system of claim 1, wherein the read data buffer allocation tracker receives feedback from the port read response queue.

9. The system claim 1, wherein each of the plurality of read data buffers includes a plurality of command queue entries.

10. The system of claim 1, wherein the command queue allows out of order execution of read commands.

11. A method comprising:
storing read data using a plurality of read data buffers, wherein each of the plurality of read data buffers is of a same size;
storing information corresponding to an incoming read in a port read response queue;
receiving read data buffer state information from the port read response queue by way of a read buffer allocation tracker at a command queue; and
tracking said read data buffer state information of one or more of the plurality of read data buffers using said read data buffer allocation tracker.

12. The method of claim 11, further comprising:
determining if a read data buffer is impeded using the read data buffer allocation tracker.

13. The method of claim 12, further comprising:
determining a number of read data buffers allocated to out of order read data using the read data buffer allocation tracker.

14. The method of claim 12, further comprising:
transitioning a read data buffer from impeded to unimpeded upon executing a command in the command queue.

15. The method of claim 11, further comprising:
determining if a read data buffer is unimpeded using the read data buffer allocation tracker.

16. The method of claim 11, further comprising:
determining whether a threshold number of impeded read data buffers has been reached using the read data buffer allocation tracker.

17. The method claim 16, further comprising:
transmitting a signal to the command queue indicating only unimpeded reads may be executed using the read data buffer allocation tracker.

18. The method of claim 11, further comprising:
receiving feedback from the port read response queue at the read data buffer allocation tracker.

19. The method claim 11, wherein each of the plurality of read data buffers includes a plurality of command queue entries.

20. The method of claim 11, wherein the command queue allows out of order execution of read commands.

* * * * *